US009923729B2

(12) United States Patent
Pearce

(10) Patent No.: US 9,923,729 B2
(45) Date of Patent: Mar. 20, 2018

(54) SYSTEM FOR DELIVERING UNIFIED CONFERENCES IN LIGHT OF PROHIBITION OF TOLL BYPASS

(71) Applicant: Cisco Technology, Inc., San Jose, CA (US)

(72) Inventor: Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1091 days.

(21) Appl. No.: 13/705,408

(22) Filed: Dec. 5, 2012

(65) Prior Publication Data

US 2014/0157338 A1    Jun. 5, 2014

(51) Int. Cl.
*H04N 7/14* (2006.01)
*H04N 9/04* (2006.01)
*H04N 7/173* (2011.01)
*H04L 12/18* (2006.01)
*H04N 21/65* (2011.01)
*H04M 3/56* (2006.01)
*H04N 7/15* (2006.01)
*H04L 29/06* (2006.01)

(52) U.S. Cl.
CPC ...... *H04L 12/1836* (2013.01); *H04L 65/1006* (2013.01); *H04L 65/1016* (2013.01); *H04L 65/1069* (2013.01); *H04L 65/4038* (2013.01); *H04M 3/567* (2013.01); *H04N 7/152* (2013.01); *H04N 21/65* (2013.01); *H04M 2203/5063* (2013.01)

(58) Field of Classification Search
CPC ............. H04L 12/1836; H04L 65/1006; H04L 65/1016; H04L 65/1069; H04L 65/4038; H04M 3/567; H04N 7/152; H04N 21/65
USPC .......................... 348/14.08, 207.99; 725/109
See application file for complete search history.

(56) References Cited

U.S. PATENT DOCUMENTS

| | | | |
|---|---|---|---|
| 2004/0179092 A1* | 9/2004 | LaPoint | 348/14.08 |
| 2006/0233120 A1* | 10/2006 | Eshel | H04L 12/1822 370/260 |
| 2008/0095079 A1* | 4/2008 | Barkley | H04L 12/1827 370/260 |
| 2008/0298278 A1* | 12/2008 | Thakkar | H04M 3/567 370/260 |
| 2010/0245585 A1* | 9/2010 | Fisher et al. | 348/164 |
| 2013/0063613 A1* | 3/2013 | Conwell | 348/207.99 |

(Continued)

*Primary Examiner* — Kyu Chae
(74) *Attorney, Agent, or Firm* — P. Su

(57) ABSTRACT

In one embodiment, a method includes obtaining geographic information from a first party when the first party attempts to join a collaborative session, and identifying a first geographic region, using the geographic information, within which the first party is located. A first multipoint control unit (MCU) located within the first geographic region is identified for use in a dial out to establish a first audio connection for use by at least the first party during the collaborative session. The method also includes establishing a voice over Internet Protocol (VoIP) connection configured to shunt video between the first party and a cloud during the collaborative session, and causing the first MCU to dial out to establish the first audio connection to the cloud. The first audio connection is configured to shunt audio between the first party and the cloud while the VoIP connection shunts the video between the first party and the cloud.

20 Claims, 6 Drawing Sheets

(56) References Cited

U.S. PATENT DOCUMENTS

2013/0091284 A1\* 4/2013 Rothschild .................... 709/226
2013/0127980 A1\* 5/2013 Haddick et al. ........... 348/14.08
2014/0082416 A1\* 3/2014 Mishra et al. .................. 714/18

\* cited by examiner

SYSTEM FOR DELIVERING UNIFIED CONFERENCES IN LIGHT OF PROHIBITION OF TOLL BYPASS

TECHNICAL FIELD

The disclosure relates generally to telephony and communications. More particularly, the disclosure relates to a conductor that uses geographic locations of participants joining a scheduled unified conference associated with a Voice over Internet Protocol (VoIP) to allocate local (MCUs) to dial an audio access number.

BACKGROUND

As the use of Voice over Internet Protocol (VoIP) systems increases, many countries have implemented legal policies to essentially protect their telephony providers, e.g., public switched telephony networks (PSTNs), from VoIP systems. That is, many countries effectively prohibit enterprises with VoIP systems from engaging in "toll bypass" by implementing laws that make it illegal to avoid toll charges by routing calls to PSTN gateways homed in other geographic locales.

When a user within an enterprise schedules a collaborative meeting, as for example using WebEx web conferencing available from Cisco Systems, Inc. of San Jose, Calif., a scheduling portal associated with the enterprise and a scheduling portal in a cloud generally collaborate. The scheduling portal in the cloud reserves cloud audio resources and a bridge, e.g., a video or presentation bridge, and provides dial-in codes to the enterprise. The enterprise then reserves local enterprise resources using the dial-in codes. At the time of the collaborative meeting, a multipoint control unit (MCU) of the enterprise that is located in a specific geographic location within the enterprise contacts an MCU of the cloud over a session initiation protocol (SIP) connection between the enterprise and the cloud. Typically, audio is handled by the SIP connection.

When audio is handled by a SIP connection or, more generally, a voice over Internet Protocol (VoIP) connection, any legal requirements that require audio associated with a call to be routed through a public switched telephone network (PSTN) may be violated. That is, multiparty collaborative sessions may result in cross-geography calls that violate laws by effectively engaging in toll bypass. For example, if a conference bridge supports multiple participants in different geographic locations, when a speaker form a particular geographic location speaks, his or her audio may be relayed from a gateway at the particular geographic location into a cloud bridge. When the audio relayed from a gateway at a particular geographic location is provided by the conference bridge to a participant in a geographic location with a legal requirement that requires audio to be routed through a PSTN, the legal requirement itself, or at least the spirit of the legal requirement, is generally violated.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
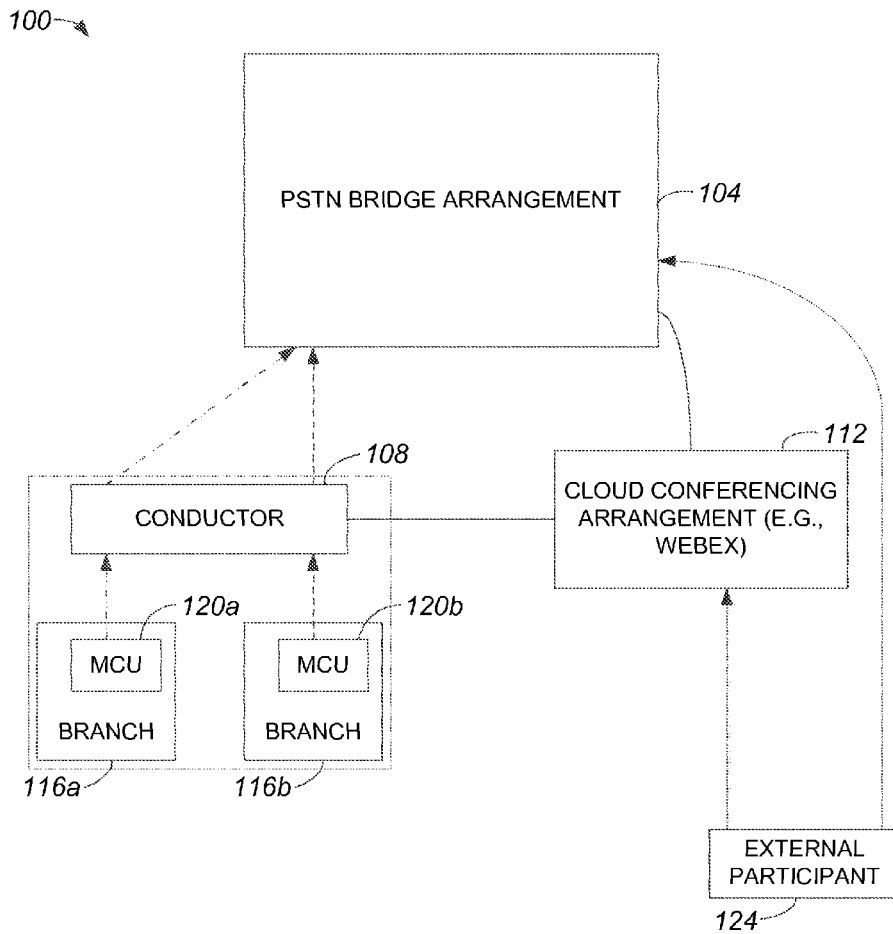
FIG. 1 is a block diagram representation of an overall network in which a conductor may allocate local multipoint control units (MCUs) to support parties in a conference based on the geographic locations of the parties in accordance with an embodiment.

According to one aspect, a method includes obtaining geographic information from a first party when the first party attempts to join a collaborative session, and identifying a first geographic region, using the geographic information, within which the first party is located. A first multipoint control unit (MCU) located within the first geographic region is identified for use in a dial out to establish a first audio connection for use by at least the first party during the collaborative session. The method also includes establishing a voice over Internet Protocol (VoIP) connection configured to shunt video between the first party and a cloud during the collaborative session, and causing the first MCU to dial out to establish the first audio connection to the cloud. The first audio connection is configured to shunt audio between the first party and the cloud while the VoIP connection shunts the video between the first party and the cloud.

Description

A collaborative session, e.g., a multi-media conference call, in which an enterprise participates typically utilizes a single enterprise multipoint control unit (MCU) which is present at a specific geographic location to contact an MCU in a cloud over a session initiation protocol (SIP) connection between the enterprise and the cloud. The single enterprise MCU supports audio, as well as video and/or presentations, associated with the collaborative session. As will be appreciated by those skilled in the art, multiparty collaborative sessions may result in cross-geography calls, e.g., parties of a multiparty collaborative session may include parties located at different geographies such as geographies which have legal requirements that require audio portions of calls to be routed through a public switched telephone network (PSTN).

To avoid violating legal requirements, or at least the spirit of legal requirements, that require audio portions of calls to be routed through a PSTN and not through voice over Internet Protocol (VoIP) connections, audio portions of calls may be supported by geographically collocated MCUs within an enterprise. An enterprise which includes a plurality of geographic regions, e.g., branches, may utilize an MCU that is local to each of the geographic regions to establish audio connections, while a corresponding video connection may be established using a single SIP dial out. It should be appreciated that a video connection is not limited to being established using a single SIP dialout.

In one embodiment, users, e.g., session participants, at different geographic locations associated with an enterprise may participate in a collaborative session such that audio communications are supported by different MCUs within the enterprise. That is, direct participants in a collaborative session may connect to different MCUs within an enterprise, and each of the MCUs within the enterprise may dial out to an audio bridge for the collaborative session. As such, at least one audio connection is established with respect to each geographic location with an MCU that is accessed by a direct participant to a collaborative session. Hence, a collaboration session may have several different audio connections from within an enterprise, and each of the audio connections may be associated with a geographic region within the enterprise.

When an enterprise effectively has multiple audio out dials to a collaborative session, e.g., a conference call associated with a cloud-based collaboration platform, that each correspond to a different geographic location, and one SIP video or presentation out dial, legal requirements such as logical partitioning laws which specify that a PSTN network is to be used for audio calls may be abided by. With each geographic location within an enterprise having its own audio dial out, audio traffic may be routed through PSTN gateways and not through a SIP connection. Hence, audio entering any given point of presence (POP) from a particular geography is not sourced from a different geography, e.g., is sourced though the audio dial out for that particular geography, and is in compliance with logical partitioning laws which specify that a PSTN network is to be used for audio calls. A POP is generally a connection to a coverage area of a particular service provider. Such a connection may include, but is not limited to including, a circuit gateway to a PSTN or a VoIP signaling connection, e.g., a VoIP signaling connection through a session border controller.

As parties join a collaborative session supported by a collaborative system, as for example a pre-scheduled conference call, the parties may provide dial-in information to a conductor associated with cloud. A cloud is generally a network that allows for secure application delivery, and enables real-time collaboration between parties at various locations. The information provided to a conductor may include geographic location, such as an actual physical location at which h a party is located or with which a party is associated. The conductor may allocate MCUs that are local to each geographic location at which a party is located, and add the allocated MCUs to a video cascade while causing the allocated MCUs to each dial an audio access number to establish an audio connection to a cloud. As a result, audio traffic may flow through audio connections created by the allocated MCUs while video traffic may be network along a video cascade associated with a premises and shunted across an SIP premises-to-cloud connection. It should be appreciated that a conductor effectively provides an intelligent conferencing function, and may be embodied as a part of a call agent or may be embodied as a substantially standalone component. In one embodiment, a premises is a branch office, and a video cascade may involve relaying video among substantially all allocated MCUs such that one particular MCU may be tasked with relaying mixed video to a bridge in a cloud.

Referring initially to FIG. 1, an overall network in which a conductor may allocate local MCUs to support parties in a collaboration session, e.g., a conference, based on the geographic regions in which the parties are located in accordance with an embodiment. An overall network 100 includes geographic regions or branches 116a, 116b that are associated with an enterprise, or a major data center. A conductor 108, in addition to branches 116a, 116b, may be part of an enterprise network. Each branch 116a, 116b has an associated MCU 120a, 120b that is arranged to perform an audio dial out for its branch 116a, 116b. By way of example, MCU 120a may be arranged to perform an audio dial out for branch 116a while MCU 120b may be arranged to perform an audio dial out for branch 116b. Such a dial out may be to a carrier-hosted audio, and possibly carrier-hosted video, MCU (not shown).

As will be appreciated by those skilled in the art, MCUs 120a, 120b may be considered to be endpoints configured to bridge connections associated with a collaboration session, e.g., an audiovisual conference. Typically, an MCU 120a, 120b may be configured to support collaboration sessions involving multiple parties or participants. In one embodiment, an MCU 120a, 120b may serve as a gatekeeper.

Conductor 108 allocates MCU 120a to perform an audio dial out for branch 116a, and allocates MCU 120b to perform an audio dial out for branch 116b. Conductor 108 is arranged to use information provided by a participant (not shown) located at a branch 116a, 116b to identify an appropriate MCU 120a, 120b to perform an audio dial out for a collaboration session. Information which may be used by MCUs 120a, 120b to perform an audio dial out, as for example a dial-in number for an audio bridge associated with a PSTN bridge arrangement 104, may be obtained by conductor 108 and provided to MCUs 120a, 120b. MCUs 120a, 120b may perform audio dial outs by dialing through PSTN bridge arrangement 104 to establish connections through which audio may be shunted.

Conductor 108 may effectively communicate with a cloud conferencing arrangement 112 during a collaboration session. Video or presentation information associated with a collaboration session may be provided by cloud conferencing arrangement 112 to branches 116a, 116b through conductor 108. In one embodiment, conductor 108 may nominate one of MCUs 120a, 120b to provide cascaded video to a cloud video bridge, and may also inform each site-specific MCU 120a, 120b to dial an audio access number for an MCU 120a, 120b that supports provider audio.

An external participant 124, or a participant that is not within either branch 116a or branch 116b, may participate in a collaboration session by connecting to cloud conferencing arrangement 112, e.g., using an Internet connection, and by establishing a connection with PSTN bridge arrangement 104.

Figure 2:
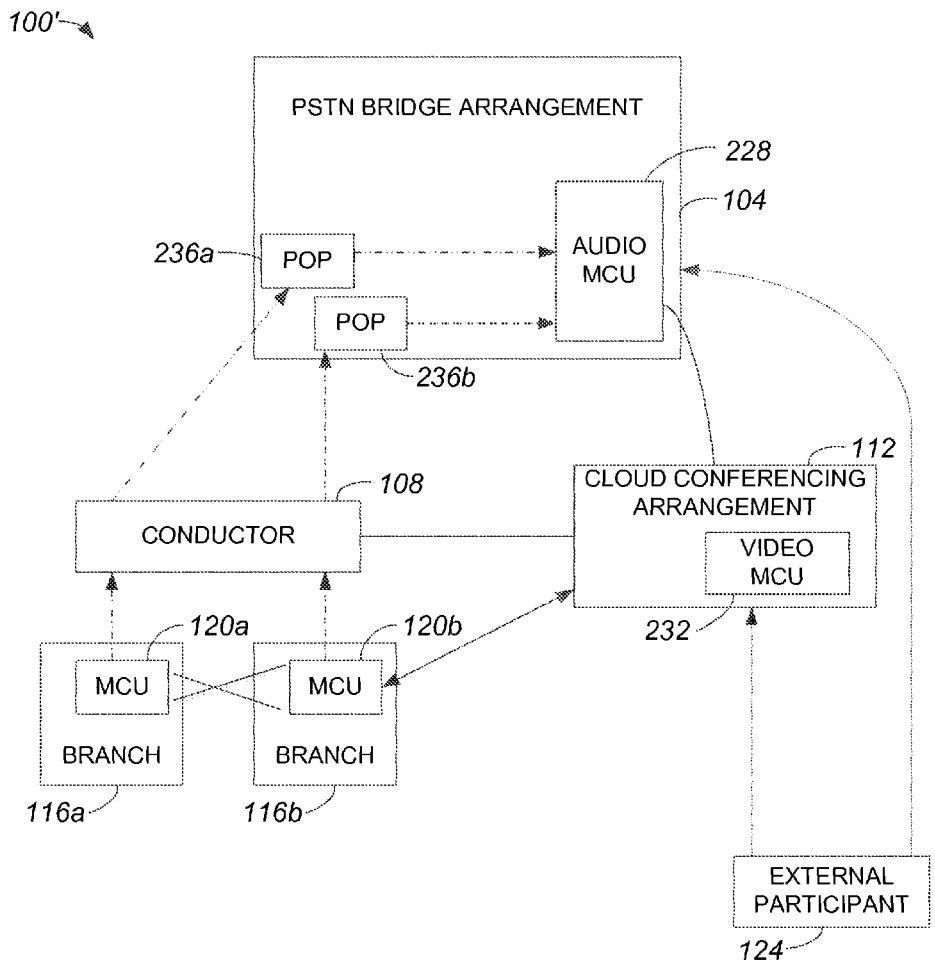
FIG. 2 is a block diagram representation of an overall network, e.g., network 100 of FIG. 1, in which a public switched telephone network (PSTN) bridge arrangement is shown as including an audio MCU and a plurality of post office protocol (POP) servers in accordance with an embodiment.

PSTN bridge arrangement 104 may include an audio MCU that supports audio communications associated with a collaboration session. FIG. 2 is a block diagram representation of an overall network, e.g., network 100 of FIG. 1, in which PSTN bridge arrangement 104 includes an audio MCU and a plurality of POPs in accordance with an embodiment. As shown, within overall network 100', PSTN bridge arrangement 104 includes POPs 236a, 236b and an audio MCU 228. POPs 236a, 236b are generally location-specific. POP 236a is arranged to support branch 116a, and POP 236b is arranged to support branch 116b.

Through POPs 236a, 236b, dial outs from MCUs 120a, 120b may access audio MCU 232. By way of example, an audio dial out from MCU 120a may access audio MCU 232 through POP 236a, while an audio dial out from MCU 120b may access audio MCU 232 through POP 236b. In one embodiment, when MCUs 120a, 120b each have an audio connection to a collaboration session, one of MCUs 120a, 120*b* may be arranged to connect to cloud conferencing arrangement 112 to establish a video cascade with a video MCU 232 included in cloud conferencing arrangement 112. POPs 236*a*, 236*b* may include PSTN gateways connected to central offices or the like associated with coverage areas of particular service providers.

Figure 3:
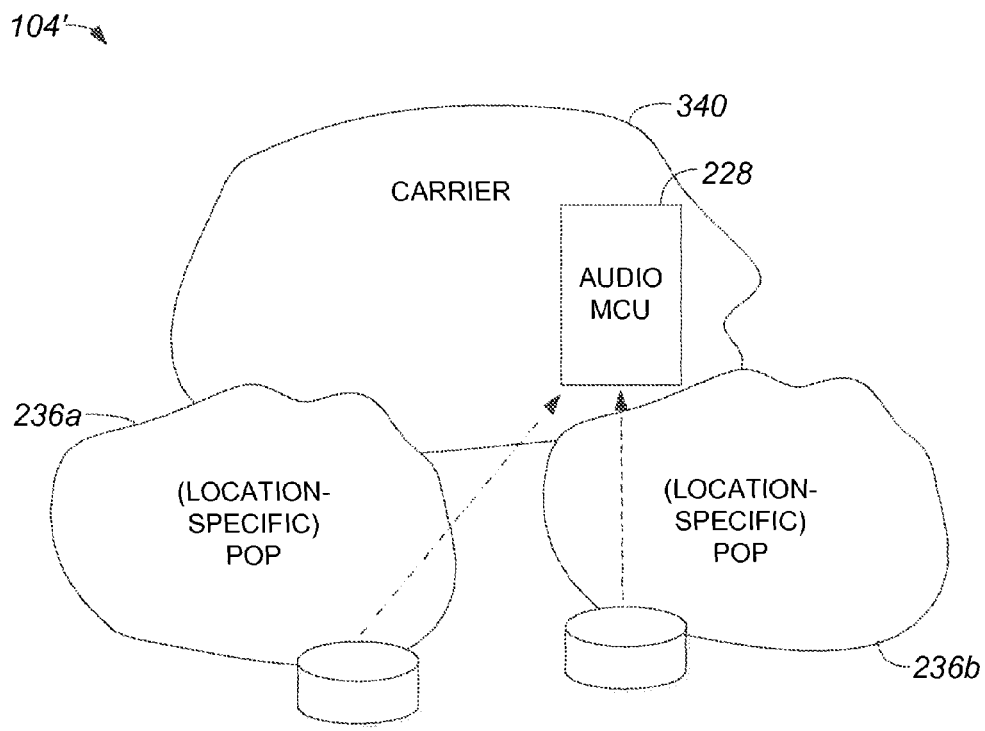
FIG. 3 is a diagrammatic representation of a PSTN bridge arrangement, e.g., PSTN bridge arrangement 104 of FIG. 1, in accordance with an embodiment.

With reference to FIG. 3, a PSTN bridge arrangement, e.g., PSTN bridge arrangement 104 of FIG. 1, will be described in accordance with an embodiment. A PSTN bridge arrangement 104' generally includes at least one PSTN POP 236*a*, 236*b*. Each POP 236*a*, 236*b* obtains communications, as for example audio communications, from an enterprise network (not shown) that are associated with a collaboration session. In one embodiment, POP 236*a* obtains audio communications originating from one geographic region associated with an enterprise, while POP 236*b* obtains audio communications originating from another geographic region associated with the enterprise. As POP 236*a* obtains audio sourced substantially only from a first geographic region that it serves, and POP 236*b* obtains audio sourced substantially only from a second geographic region that it serves, the audio entering either POP 236*a*, 236*b* is not sourced from more than one geographic region and, therefore, a collaboration system that includes PSTN bridge arrangement 104' is in compliance with legal requirements which specify neither POP obtains audio source that audio portions of calls be routed through a PSTN.

POPs 236*a*, 236*b* are configured to transmit and to receive audio from an audio MCU 228 associated with a carrier or a service provider 340. Although carrier 340 is shown as being a substantially separate element, it should be appreciated that carrier 340 may instead be a substantially distributed entity with local points of presence with respect to different geographic regions. Carrier 340 includes functionality to mix audio obtained through POPs 236*a*, 236*b*, as well as from other elements associated with a collaboration session, e.g., a video MCU of a cloud conferencing arrangement.

Figure 4:
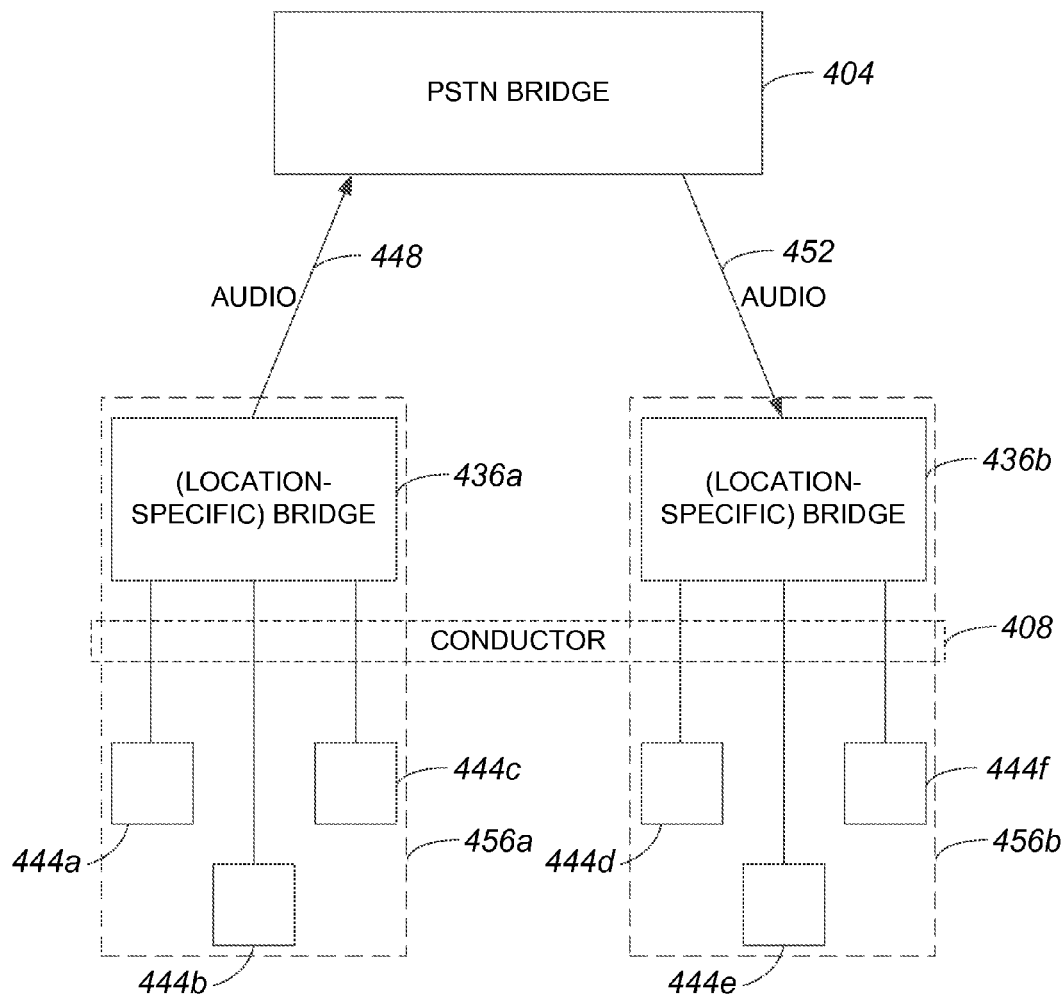
FIG. 4 is a block diagram representation of the routing of audio from a party in one geographic location to a party in another geographic location during a conference in accordance with an embodiment.

FIG. 4 is a block diagram representation of the routing of audio from a party in one geographic region to a party in another geographic region during a collaboration session such as a conference in accordance with an embodiment. When at least one party 444*a-c* in a first geographic region 456*a* attempts to join a collaboration session, the at least one party 444*a-c* may contact a conductor 408. Conductor 408 may allocate and cascade a geography-specific MCU 436*a*, or bridge, that may support video and audio communications, e.g., may shunt audio and video, between first geographic region 456*a* and a cloud (not shown) during the course of a collaboration session. Additionally, conductor 408 may allocate and cascade a geography-specific MCU 436*b*, or bridge, that may support video and audio communications between a second geographic region 456*b* within which parties 444*d-f* are located and a cloud (not shown). In one embodiment, first geographic region 456*a* and second geographic region 456*b* may be a part of the same enterprise, e.g., may be branches of the same organization or a major data center. Conductor 408, first geographic region 456*a*, and second geographic region 456*b* may be part of an enterprise network. It should be appreciated that conductor 408 serves as a coordinator that picks MCUs 436*a*, 436*b* and effectively commands MCUs 436*a*, 436*b* to perform dialouts to a PSTN bridge 404, as appropriate. Conductor 408 may be embodied as a function within a call agent such as a Unified Communications Manager (UCM) (not shown).

MCU 436*a*, which is located within first geographic region 456*a*, is allocated by conductor 408 to support audio communications associated with parties 444*a-c* in first geographic region 456*a*. Conductor 408 identifies MCU 436*a* and effectively allocates MCU 436*a* to shunt audio between first geographic region 456*a* and a cloud (not shown) during a collaboration session, and MCU 436*a* dials out through a PSTN bridge 404 to establish a communications channel 448 through which audio may be transmitted and received. It should be appreciated that PSTN bridge 404 generally includes at least one POP (not shown) and an audio MCU (not shown) associated with a service provider (not shown), e.g., a phone service carrier.

Similarly, MCU 436*b*, which is located within second geographic region 456*b*, is allocated by conductor 408 to support audio communications associated with parties 444*d-f* in second geographic region 456*b*. Conductor 408 identifies MCU 436*b* and effectively allocates MCU 436*b* to shunt audio between second geographic region 456*b* and a cloud (not shown) during a collaboration session, and MCU 436*b* dials out through PSTN bridge 404 to establish a communications channel 452 through which audio may be transmitted and received. Communications channel 448 and communications channel 452 may be established through dial outs implemented by MCU 436*a* and MCU 436*b*, respectively. In one embodiment, video is shunted to a cloud (not shown) and audio is shunted to PSTN bridge 404.

During a collaboration session, when a party 444*a-c* within first geographic region 456*a* speaks or otherwise generates audio, the audio is shunted or transmitted to parties 444*d-f* within second geographic region 456*b* through channel 448 to PSTN bridge 404. PSTN bridge 404 may mix the audio generated from within first geographic region 456*a*, as for example with audio obtained from other sources (not shown), and provide that mixed audio through channel 452 to MCU 436*b*, which then distributes the video to parties 444*d-f* within second geographic region 456*b*.

Figure 5:
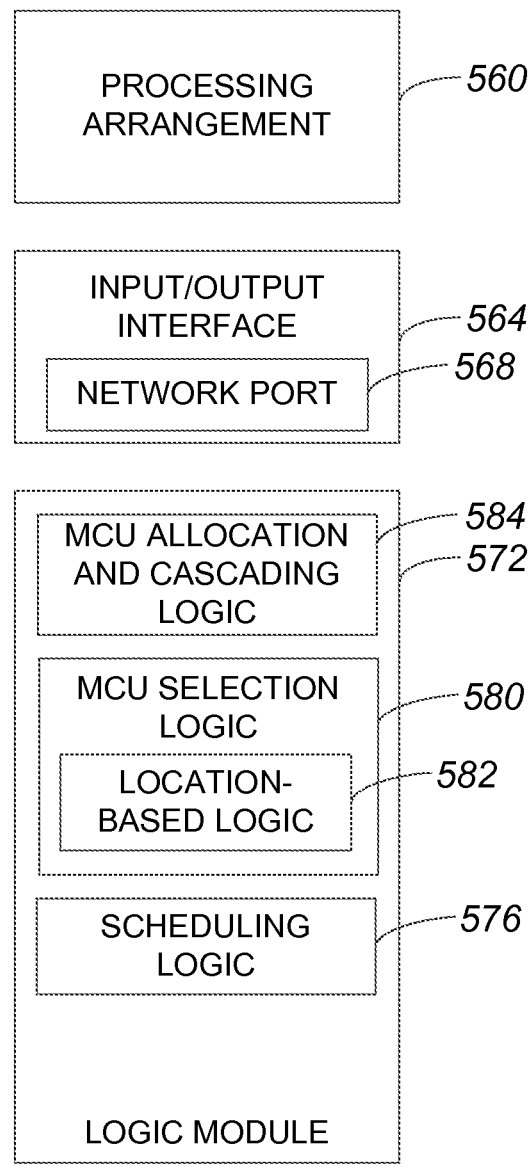
FIG. 5 is a block diagram representation of a conductor in accordance with an embodiment.

With reference to FIG. 5, a conductor that is suitable for use in selecting MCUs from different geographic regions or locations for use in establishing audio connections for a collaboration session will be described in accordance with an embodiment. A conductor 508 generally manages parties in a collaboration session such as a call, and allows parties in a call to participate in the call. In general, a conductor includes a processing arrangement 560 that includes at least one processor, an input/output (I/O) interface 564, and logic 572.

I/O interface 564 is arranged to enable conductor 508 to communicate with a cloud and with parties or, more specifically, communications devices associated with the parties. The communications devices associated with the parties may include, but are not limited to including, computing devices, telephones, mobile voices, and/or VoIP devices. I/O interface 564 may generally relay commands, e.g., commands from a UCM (not shown), to associated MCUs (not shown). In addition, I/O interface 564 may support wired and/or wireless communications with participants and with a cloud. At least one network port 568 is typically included in I/O interface 564.

Logic 572, which may be embodied as a module, may generally include hardware and/or software, e.g., executable code devices which may be executed by processing arrangement 560. In one embodiment, logic 572 includes scheduling logic 576, MCU selection logic 580, MCU allocation and cascading logic 584. Scheduling logic 576 is configured to effectively schedule bridges for a collaboration session. In one embodiment, scheduling logic 576 is configured to cooperate with a scheduler associated with a cloud to obtain bridge access numbers and to schedule bridges. MCU selection logic 580 is generally configured to select at least one MCU for use in performing an outdial to a cloud. Location-based logic 582, which is included in MCU selection logic 580, is configured to determine a geographic region at which a participant in a collaboration session is located, and to identify a suitable MCU to perform an outdial to an audio bridge for the geographic region. That is, location-based logic 580 identifies geographically collocated MCUs for use in performing outdials for different geographic regions within which participants are located. Generally, MCU selection logic 580 obtains information that identifies a geographic location associated with a participant from the participant when the participant dials into conductor 508.

MCU allocation and cascading logic 584 allocates local MCUs, adds the allocated local MCUs to a video cascade associated with a collaboration session, and causes the allocated local MCUs to dial an audio access number. MCU allocation and cascading logic 584 also allows video or presentation portions of a collaboration session to be networked along an on-premises video cascade, and provided across an SIP premises-to-cloud connection. In general, MCU allocation and cascading logic 584 includes functionality that supports audio cascading and video cascading.

Figure 6:
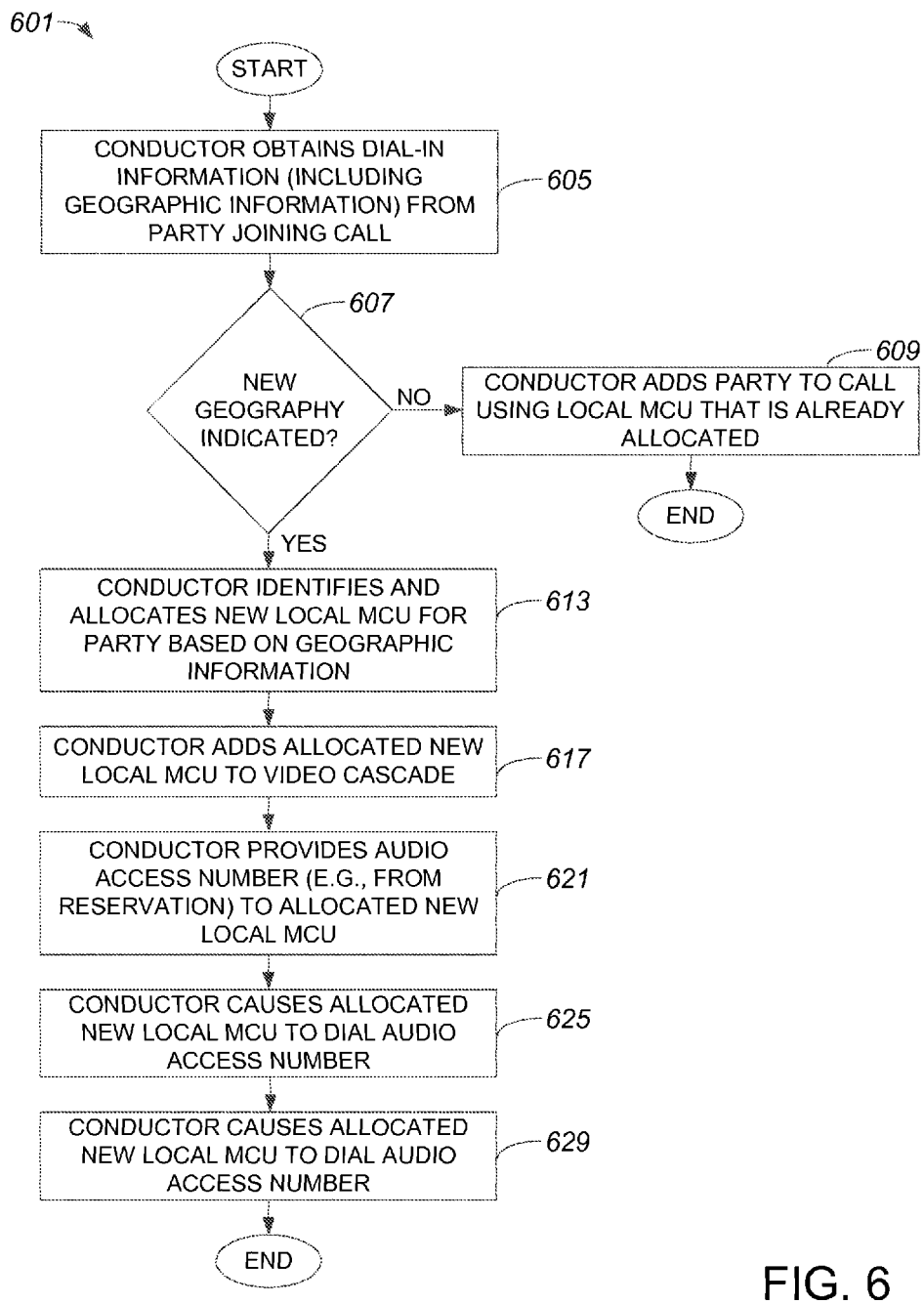
FIG. 6 is a process flow diagram which illustrates a method of operating a conductor in accordance with an embodiment.

FIG. 6 is a process flow diagram which illustrates a method of operating a conductor in accordance with an embodiment. A method 601 of operating a conductor begins at step 605 in which a conductor obtains dial-in information from a party joining a collaborative session, e.g., a conference call. The dial-in information generally includes geographic information that indicates a physical location of the party. By way of example, the dial-in information may be an address or phone number from which the party is dialing in.

A determination is made in step 607 as to whether the geographic information obtained by the conductor is associated with a new geography. That is, it is determine whether the party is in a geographic location that the conductor has not already associated with the call. For example, if the party is the first call participant to dial in form a particular overall location that is serviced by a particular MCU which has not already established an audio connection with respect to the call, then the particular site is considered to be a new geography.

If the determination in step 607 is that a new geography is not indicated, the implication is that a geographically collocated MCU that essentially covers the geographic region at which the party is located, or an MCU local to the party, already has an connection for the call. In other words, if a new geography is not indicated, then the implication is that a local MCU which covers the geographic region at which the party is located has previously been allocated. Accordingly, process flow moves from step 607 to step 609 in which the conductor adds the party to the call using the local MCU that is already allocated. Once the party is added to the call, the method of operating a conductor is completed.

Alternatively, if the determination in step 607 is that a new geography is indicate, then the conductor identifies and allocates a new local MCU for the party in step 613 based on the geographic information obtained by the conductor. The new local MCU is typically an MCU that supports the overall geographic location in which the conductor is located. After the new local MCU has been allocated, the conductor adds the allocated new local MCU to a video cascade associated with the call in step 617.

In step 621, the conductor provides an audio access number, e.g., an audio access number obtained from a reservation associated with the call, to the allocated new local MCU. By dialing out to the audio access number, the allocated new local MCU may effectively establish an audio connection to a cloud for the overall geographic location. As such, the conductor causes the allocated new local MCU to dial the audio access number in step 625. Upon dialing the audio access number, the allocated new local MCU establishes an audio connection in step 629 that the party may use to participate in the call, and the method of operating a conductor is completed.

Although only a few embodiments have been described in this disclosure, it should be understood that the disclosure may be embodied in many other specific forms without departing from the spirit or the scope of the present disclosure. By way of example, while the use of multiple audio out dials each corresponding to a particular geographic location, in cooperation with a single SIP video or presentation dial out, to support a collaborative session within an enterprise has been described, multiple SIP video or presentation dial outs may also be implemented. In other words, both audio traffic and video traffic may be handled using geography-specific dial outs performed by geography-specific elements, e.g., MCUs.

While video has generally been described as being handled by a cloud service, it should be appreciated that video is not limited to being handled by a cloud service. For example, in some embodiments, a video bridge may be handled by a service provider in lieu of a cloud service. In other words, the handling of video may effectively be decoupled from the handling of audio.

The embodiments may be implemented as hardware and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
obtaining geographic information from a first party when the first party attempts to join a collaborative session;
identifying a first geographic region within which the first party is located, wherein the first geographic region is identified using the geographic information;
identifying a first multipoint control unit (MCU) located within the first geographic region for use in a dial out to establish a first audio connection for use by at least the first party during the collaborative session;

establishing a voice over Internet Protocol (VoIP) connection, the VoIP connection being configured to shunt video between the first party and a cloud during the collaborative session;

causing the first MCU to dial out to establish the first audio connection to the cloud, the first audio connection being configured to shunt audio between the first party and the cloud while the VoIP connection shunts the video between the first party and the cloud.

2. The method of claim 1 wherein the audio is an audio portion of the collaborative session and the video is a video portion of the collaborative session, the method further including:

identifying a second MCU located within a second geographic region for use in a dial out to establish a second audio connection, wherein the first geographic region and the second geographic region are associated with an enterprise; and causing the second MCU to dial out to establish the second audio connection to the cloud, the second audio connection being configured to shunt the audio between the second geographic region and the cloud during the collaborative session.

3. The method of claim 2 wherein a first plurality of parties associated with the collaborative session is located within the second geographic region, and wherein the second audio connection is configured to shunt the audio between the first plurality of parties and the cloud during the collaborative session while the VoIP connection shunts the video between the first plurality of parties and the cloud.

4. The method of claim 3 wherein the first party is included in a second plurality of parties associated with the collaborative session, the second plurality of parties being located within the first geographic region, and wherein the first audio connection is configured to shunt the audio between the second plurality of parties and the cloud during the collaborative session while the VoIP connection shunts the video between the second plurality of parties and the cloud.

5. The method of claim 1 wherein the first geographic region is associated with an enterprise, the enterprise having a plurality of geographic regions including the first geographic region, and wherein each geographic region of the plurality of geographic regions has a separate audio connection to the cloud.

6. The method of claim 5 wherein each geographic region of the plurality of geographic regions has an associated local MCU.

7. A tangible, non-transitory computer-readable medium comprising computer program code, the computer program code, when executed, configured to:

obtain geographic information from a first party when the first party attempts to join a collaborative session;

identify a first geographic region within which the first party is located, wherein the first geographic region is identified using the geographic information;

identify a first multipoint control unit (MCU) located within the first geographic region for use in a dial out to establish a first audio connection for use by at least the first party during the collaborative session;

establish a voice over Internet Protocol (VoIP) connection, the VoIP connection being configured to shunt video between the first party and a cloud during the collaborative session;

cause the first MCU to dial out to establish the first audio connection to the cloud, the first audio connection being configured to shunt audio between the first party and the cloud while the VoIP connection shunts the video between the first party and the cloud.

8. The tangible, non-transitory computer-readable medium comprising computer program code of claim 7 wherein the audio is an audio portion of the collaborative session and the video is a video portion of the collaborative session, the method, and wherein the computer program code, when executed, is further configured to:

identify a second MCU located within a second geographic region for use in a dial out to establish a second audio connection, wherein the first geographic region and the second geographic region are associated with an enterprise; and cause the second MCU to dial out to establish the second audio connection to the cloud, the second audio connection being configured to shunt the audio between the second geographic region and the cloud during the collaborative session.

9. The tangible, non-transitory computer-readable medium comprising computer program code of claim 8 wherein a first plurality of parties associated with the collaborative session is located within the second geographic region, and wherein the second audio connection is configured to shunt the audio between the first plurality of parties and the cloud during the collaborative session while the VoIP connection shunts the video between the first plurality of parties and the cloud.

10. The tangible, non-transitory computer-readable medium comprising computer program code of claim 9 wherein the first party is included in a second plurality of parties associated with the collaborative session, the second plurality of parties being located within the first geographic region, and wherein the first audio connection is configured to shunt the audio between the second plurality of parties and the cloud during the collaborative session while the VoIP connection shunts the video between the second plurality of parties and the cloud.

11. The tangible, non-transitory computer-readable medium comprising computer program code of claim 7 wherein the first geographic region is associated with an enterprise, the enterprise having a plurality of geographic regions including the first geographic region, and wherein each geographic region of the plurality of geographic regions has a separate audio connection to the cloud.

12. The tangible, non-transitory computer-readable medium comprising computer program code of claim 11 wherein each geographic region of the plurality of geographic regions has an associated local MCU.

13. An apparatus comprising:

means for obtaining geographic information from a first party when the first party attempts to join a collaborative session;

means for identifying a first geographic region within which the first party is located, wherein the first geographic region is identified using the geographic information;

means for identifying a first multipoint control unit (MCU) located within the first geographic region for use in a dial out to establish a first audio connection for use by at least the first party during the collaborative session;

means for establishing a voice over Internet Protocol (VoIP) connection, the VoIP connection being configured to shunt video between the first party and a cloud during the collaborative session;

means for causing the first MCU to dial out to establish the first audio connection to the cloud, the first audio connection being configured to shunt audio between the first party and the cloud while the VoIP connection shunts the video between the first party and the cloud.

14. An apparatus comprising:

a processing arrangement;

an input/output (I/O) interface, the I/O interface being arranged to support communications with at least one communications element associated with a collaborative session, a plurality of multipoint control units (MCUs), and a cloud;

a logic arrangement, the logic arrangement being configured to obtain geographic information that identifies a first geographic region in which the at least one communications element is located, the logic arrangement further being arranged to allocate a first MCU of the plurality of MCUs to support audio associated with the collaborative session, wherein the first MCU is located in the first geographic region and wherein the logic arrangement is further configured to cause the first MCU to perform a first audio dial out to an audio bridge, the first audio dial out being configured to support the first geographic region during the collaborative session.

15. The apparatus of claim 14 wherein the apparatus is a conductor.

16. The apparatus of claim 14 wherein the at least one communications element associated with the collaborative session includes a first communications element and a second communications element, and wherein the audio dial out is configured to support the first communications element and the second communications element.

17. The apparatus of claim 14 wherein the logic arrangement is further arranged to allocate a second MCU of the plurality of MCUs to support the audio associated with the collaborative session, the collaborative session also including video not supported by the plurality of MCUs, wherein the second MCU is located in a second geographic region, and wherein the logic arrangement is further configured to cause the second MCU to perform a second audio dial out to the audio bridge, the second audio dial out being configured to support the second geographic region during the collaborative session.

18. A method comprising:

obtaining geographic information from a first party when the first party attempts to join a collaborative session that includes audio and video;

identifying a first geographic region within which the first party is located, wherein the first geographic region is identified using the geographic information;

identifying a first multipoint control unit (MCU) located within the first geographic region for use in a dial out to establish a first audio connection for use by at least the first party during the collaborative session; and causing the first MCU to dial out to establish the first audio connection to the cloud, the first audio connection being configured to shunt the audio between the first party and the cloud.

19. The method of claim 18 wherein the first audio connection is associated with a service provider, and wherein a video bridge associated with the service provider is configured to shunt the video between the first party and the cloud.

20. A tangible, non-transitory computer-readable medium comprising computer program code, the computer program code, when executed, configured to:

obtain geographic information from a first party when the first party attempts to join a collaborative session, the collaborative session including audio and video;

identify a first geographic region within which the first party is located, wherein the first geographic region is identified using the geographic information;

identify a first multipoint control unit (MCU) located within the first geographic region for use in a dial out to establish a first audio connection for use by at least the first party during the collaborative session;

cause the first MCU to be added to a video cascade;

cause the first MCU to dial out to establish the first audio connection to the cloud, the first audio connection being configured to shunt the audio between the first party and the cloud, wherein the first audio connection is arranged to be used by a plurality of parties at the first geographic location, wherein the plurality of parties includes the first party; and cause a video bridge to be configured, the video bridge being configured to shut the video between the first party and the cloud while the audio is shunted by the first audio connection.

* * * * *